Dec. 15, 1959 G. FRIES 2,917,645
CONTROL METHOD AND MEANS
Filed Sept. 12, 1955 3 Sheets-Sheet 1
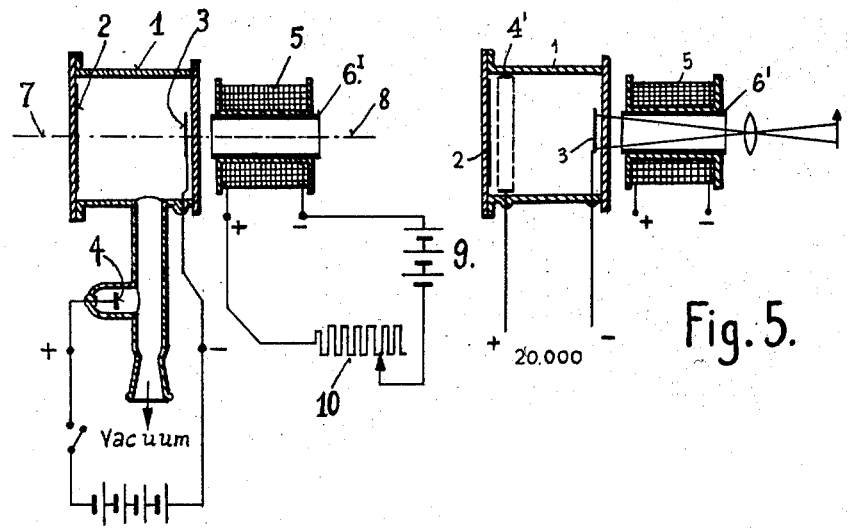
Fig. 1.
Fig. 5.
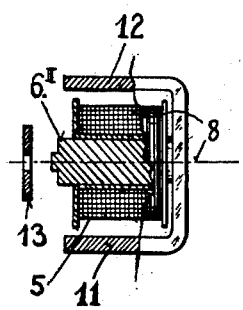
Fig. 2.
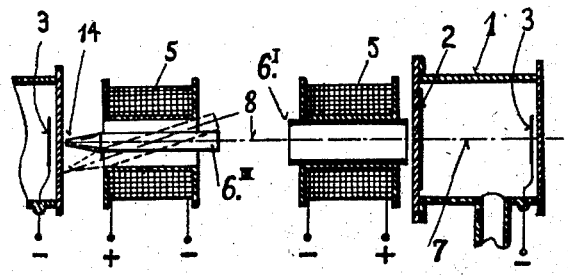
Fig. 3.
Fig. 4.
Inventor
Gustav Fries
By
Attorneys Dec. 15, 1959  G. FRIES  2,917,645
CONTROL METHOD AND MEANS
Filed Sept. 12, 1955  3 Sheets-Sheet 2
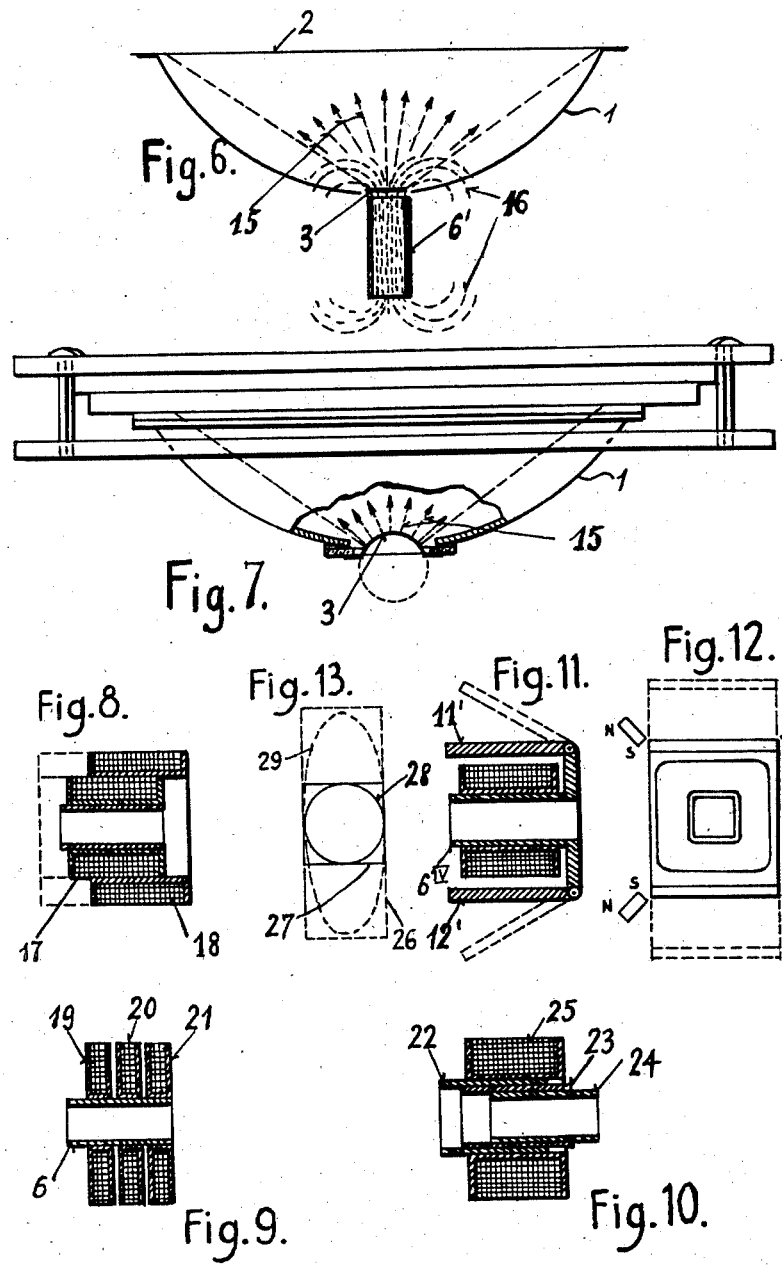
Inventor
Gustav Fries

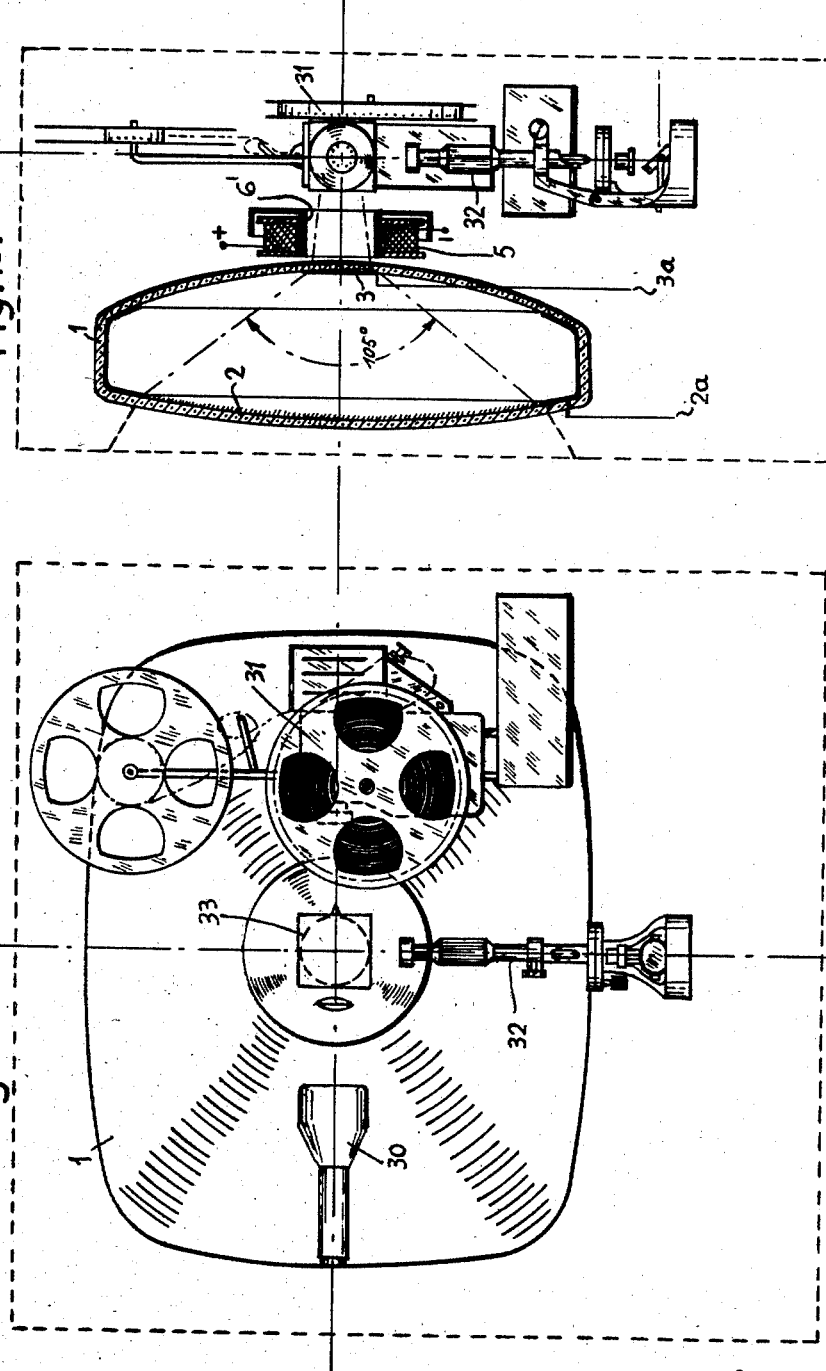

United States Patent Office 2,917,645
Patented Dec. 15, 1959

2,917,645

CONTROL METHOD AND MEANS

Gustav Fries, Heidelberg, Schlierbach, Germany, assignor to Julius Cato Vredenburg-Inglesby, London, England Application September 12, 1955, Serial No. 533,551

Claims priority, application Great Britain September 20, 1954

16 Claims. (Cl. 313—65)

The present invention relates to a method of and means for focusing or imaging a beam of electrons or other radiation of electrically charged subatomic particles. The formation of electron images is normally effected by the use of one or more electron lenses comprising electrostatic or magnetic members surrounding the electron beam and disposed between the source of electrons and the target where the image is to be formed, so that the beam is electron-optically focussed in passing through the lenses in a manner similar to the focussing of light rays in passing through optical lenses. Known apparatus for forming electron images, which may be rendered visible by a fluorescent screen or by recording on photographic material, include electron microscopes, image converters (either employing a photo cathode as an electron-emitting surface or a photo-semiconductor as an electron reflecting surface) and television pick-up tubes. The electron lens may produce an enlarged image or may concentrate the electron beam into a sharply defined small area.

The present invention has for its object to provide an improved and simple method and apparatus whereby an electron beam or other beam of electrically charged subatomic particles may be imaged, rendered visible or recorded with any desired degree of enlargement or reduction.

With this object in view, the invention provides a system for producing focussed radiation of electrically charged subatomic particles, comprising a radiation emitting element, a target to which the radiation is to proceed, said target being spaced from the emitting element, means for producing an electric field accelerating the particles from said emitting element to the target, and magnet means for producing a field having an axis passing approximately through said emitting element and said target, said magnet means being arranged axially beyond the part of said axis confined between said emitting element and target.

More specifically in the art of producing electron images, according to the invention, the control of the divergence or convergence of an electron beam is effected by means of a magnetic field produced by a magnet, preferably an electro-magnet, disposed either behind the surface from which the electrons are radiated (that is at that side of the surface opposite to the direction of electron radiation) or alternatively beyond the target or screen on which the image is to be formed or beyond the end of the evacuated vessel containing the cathode (that is to the side of said target or outside the end of the vessel which is remote from the surface radiating the electrons). With the magnet disposed in the first-mentioned position, the electron beam will be caused to diverge to produce an enlarged image, whereas with the magnet disposed in the second-mentioned position convergence of the electron beam is produced. In either case the electron beam to be controlled is not surrounded by the magnet as is the case with known electron lenses.

The field of application of the invention is however not limited to the formation of images by the use of electron radiation but also extends to the formation of images by all those kinds of radiation which are known as corpuscular radiation of subatomic particles capable of being deflected magnetically.

Further features of the invention consist in various advantageous constructions of the focussing electromagnet system according to the invention, which will be hereinafter described.

In order that the invention may be more clearly understood, reference will now be made to the accompanying draings, in which:

Figure 1 shows a side view of one form of apparatus according to the invention.

Figures 2 and 3 show modified constructions of magnet.

Figure 4 shows a modification of Figure 1 for producing a reduced image.

Figure 5 shows a further modification.

Figures 6 and 7 serve for explaining the manner in which it is believed that the large angle of radiation is obtained by means of the invention.

Figures 8, 9 and 10, show various modified constructions of the electromagnet system.

Figures 11 and 12 shows a side section and end view of another modified electromagnet system.

Figure 13 is a diagram for explaining the function of the device shown in Figures 11 and 12.

Figures 14 and 15 are a rear view and a side section of an apparatus according to the invention.

The apparatus illustrated in Figure 1 comprises a glass envelope 1 which is either evacuated or connected by a side tube to a source of vacuum whereby it can be evacuated. The envelope is for example of cylindrical form having front and rear end walls. On the internal surface of the front wall is applied a fluorescent screen 2 and opposite to this screen and adjacent the rear wall is arranged a cathode surface 3 which is small in relation to the size of the luminous screen 2 and may consist, for example, of thin sheet aluminium. 4 is an anode and by applying a voltage, for example of 5000 volts across the cathode 3 and anode 4, an electron discharge can be produced within the tube. The tube is evacuated to such an extent that the discharge, when once initiated, will just fail to extinguish. This would be at a pressure just short of $10^{-3}$ mm. of mercury. Under these conditions, a blurred image of the cathode surface 3 and of any markings thereon will be produced in known manner on the luminous screen 2 on a slightly enlarged scale. In the test apparatus the distance between the screen 2 and the cathode 3 was about 9 centimetres.

If now, according to the present invention, an electric coil 5 provided with a soft iron core tube 6' is positioned behind the cathode 3 with its axis 8 substantially in alignment with the axis 7 of the tube and an electric current from the source 9 is fed through the coil 5 via the control resistance 10, the image of the cathode surface which appears on the luminous screen 2 will be enlarged several times. The sharpness of the image can be adjusted by moving the coil 5 either backwards or forwards in the direction of the axis 8. Focussing may alternatively be effected by only displacing the core tube 6' or by adjusting the current flowing through the coil 5 by means of the control resistance 10. The degree of enlargement of the image remains substantially unaltered by the above-mentioned focussing operations.

Instead of a tubular core 6', a solid core 6'', as shown in Figure 2, may alternatively be used. There will be substantially no change in the degree of enlargement if the solid core 6'' is of the same external diameter as the core 6'. The coil may be provided with yoke legs 11, 12 or the yoke may be of cylindrical form.

The degree of enlargement appears to depend on the diameter of the core; thus if a disc 13, which is larger than the diameter of the core, is mounted on the end of the core of Figure 2, a less degree of enlargement will be produced.

On the other hand, a greater degree of enlargement is produced when the diameter of the core is reduced, as shown for example in Figure 3, in which the core 6''' is of smaller diameter than in the preceding embodiments and is tapered to a point 14 (which may have a flattened end) at its end adjacent the cathode 3. The image which becomes visible on the screen 2 is so greatly enlarged that, in fact with the apparatus used, the image of the part of the cathode surface opposite the point 14 occupied the whole area of the screen 2. By directing the pointed end to different parts of the cathode (for example by tilting the core as shown in broken lines) the corresponding part of the cathode was reproduced on the screen 2 on an enlarged scale. Focussing may be effected by moving the point 14 towards and away from the cathode 3, or by varying the current through the coil 5 as with the previously described embodiments.

Instead of producing an enlarged image, the method and apparatus according to the invention can alternatively be used for reducing the size of the image, even down to images of point-like size. This reduction is achieved, as illustrated in Figure 4, by positioning the magnet coil 5 with its core 6' beyond the opposite end of the tube 1, that is beyond the luminous screen 2. The concentrated electron beam may be arranged to pass out of the tube 1 through an electron permeable window. It may, for example, be focussed on to photographic material arranged outside the tube 1.

The invention can also be applied to focussing an electron beam in high vacuum tube, in which case the cathode must be capable of emitting electrons in a high vacuum, for example a photo cathode or a thermionic cathode. For example, as shown in Figure 5 the apparatus may comprise an evacuated glass envelope 1 having a fluorescent screen 2 on one end wall and a photo cathode 3 on the opposite end wall. A D.C. potential of say 20,000 volts is applied between the cathode 3 and the anode 4' to accelerate the electrons released from the photo cathode 3, towards the screen 2. Behind the photo cathode is arranged the coil 5 with its core tube 6'. The photo cathode may be illuminated by an optical image projected thereon either through the core tube 6' or from the side of the photo cathode opposite to the magnet. An enlarged optical image of the electron image emitted from the photo cathode will then be produced on the screen 2, the sharpness of which may be adjusted in the manners above described.

The following explanation given in conjunction with Figures 6 and 7 is believed to be a correct explanation of the reasons for achieving the wide angle of radiation according to the invention, but it is to be understood that this explanation is given only for the purpose of attempting to give a better understanding of the invention and it is in no way to be construed as the true technical explanation according to which the invention operates or as in any way limiting the scope of the invention.

In Figure 6, 6' is the iron core of the magnet (coil not shown) similar to that described with reference to Figure 1. 1 is the envelope and 3 is the cathode of which the metal surface is imaged on an enlarged scale on the luminous screen 2 (for example a calcium-tungstate layer) by means of the corpuscular radiation 15 (in the example considered electrons released by cold discharge). By means of the coil arranged around the iron tube 6', and through which a direct current is passed, the tube 6' is magnetised and the lines of force 16 of the magnetic field produced penetrate the cathode, the lines 16 being arranged in surfaces of revolution and forming angles with the cathode extending from 0° to 90°. The electrons, at their instant of leaving the cathode, are therefore believed to be forced to radiate from the cathode in predetermined angular directions determined by the lines of force. From this results, upon the impact of the electron radiation 15 upon the luminous screen 2, an enlarged image of the cathode surface 3.

By displacing the tube 6' e.g. in an axial direction, positions will be found at which the image of the cathode surface on the luminous screen 2 appears as a sharp image. It should be mentioned that a sharp image would appear to be produced when the tube 6' is arranged at a plurality of different distances from the cathode 3. In actual fact two positions have been observed, and it should be added that the image on the luminous screen 2 does not differ substantially whether one or the other of these positions is selected, no inversion or rotation of the image having been observed. No explanation for this has so far been found with the use of the known rules of geometrical optics.

When the cathode 3 is formed as a segment of a sphere, as shown in Figure 7, then an enlarged but indistinct image of the cathode surface is formed even without the application of magnetic lines of force penetrating the cathode 3. Sharp focussing can however be obtained by means of a magnetic optical system according to the invention, and it is found that as compared with the use of a flat cathode 3, as shown in Figure 6, there is an additional enlargement, which appears to be due tot he fact that the electron rays 15 are already emitted with a preferred direction of radiation corresponding to the curvature of the cathode surface.

Figures 8 to 12 show various modifications of the electromagnetic image forming optical system.

In the case of Figure 8, a second displaceable coil 18 is arranged over the core coil 17. Image correction, such as image distortion correction may be effected by displacing the coil 18 or by regulating the current passing through it.

In the case of Figure 9 three coils 19, 20 and 21 of disc form are arranged on the iron core 6', by means of which the angle of the magnetic field lines 16 (Fig. 6) may also be altered for correcting the image, this being done by displacing one or more of the coils on the core 6' or by causing currents of different strengths to flow through the coils.

A further modification for achieving sharp focussing and image correction is shown in Figure 10. In this case the core consists, for example, of three tubes 22, 23 and 24 of iron or other megnetizable material, which are telescopically slidable relative to each other, and around which the coil 25 is arranged.

Figures 11 and 12 show an electromagnetic image-forming optical system which is constructed similar to that described with reference to Figure 2 with the difference, however, that the core $6^{IV}$ is hollow and the legs 11', 12', are adjustable towards the positions shown in broken lines. By means of this arrangement image distortions can be obtained which, as shown for example in Figure 13, will cause the electron emission of a square cathode surface 27 to be reproduced in the form of an elongated rectangular image 26, or a circular cathode surface 28 to be reproduced in the form of an elongated ellipse 29. This feature becomes of practical importance for example when it is intended to reproduce wide screen cinema pictures (e.g. "Cinemascope" pictures) either directly from the film or after transmission by television, the image being distortion compensated by means of the optical system according to Figure 11 to obtain the wide-screen image on reproduction.

Permanent magnets 34 may also be provided in fixed positions to compensate for other distortions, such as the "pin-cushion" effect.

The arrangement according to the invention may be used for the produtcion of large screen images of television pictures. For this purpose the screen image of a small television cathode ray tube (for example having a screen diameter of approximately 7 centimetres and requiring an anode voltage of 600–800 volts) is projected by an optical system on to the photo cathode of an arrangement operating in the manner of Figure 5.

Similarly home cinematograph films, for example of 8 mm. size, can be projected on to the photo cathode by a low intensity lamp (such as a torch lamp bulb) to produce a brightly illuminated and much enlarged image on the screen 2.

Both television pictures and home cinema pictures may be projected alternatively on the same screen by a suitable optical selector device.

The apparatus may also be used for producing enlarged images from the eyepiece of normal optical microscopes and telescopes. It may also be used as an enlarging apparatus for photographic purposes.

Figures 14 and 15 show a practical embodiment of the apparatus which can be used for producing enlarged images from a television cathode ray tube 30, a cinema projector 31 or a microscope 32. 1 is an evacuated glass envelope provided with a fluorescent screen 2 and a semi-transparent photo cathode 3. 6' is a tubular iron core surrounded by the coil 5. The prism 33 which can be turned about the axis of the core 6' in order selectively to reflect light images from the cathode ray tube 30, the projector 31 or the microscope 32 on to the photo cathode 3.

The invention can also be applied in the construction of electron microscopes. The specimen to be examined may, for example, be mounted on the cathode 3, which may in this case, if desired be constituted by the end of the magnet core, the latter being of pointed form such as shown at 14, which is arranged to extend into the vacuum chamber substantially as indicated at 3a in Fig. 7. The specimen may be spaced from the cathode and the image produced by the electron rays transmitted through the specimen; in this case the focussing is to be so adjusted (by varying the current or the position of the coil or its core), that the image of the specimen, and not of the cathode, will be sharply defined on the target.

In view of the fact that many kinds of corpuscular radiation can be used for the image formation of the invention, it will be apparent that the invention can be used not only for producing enlarged images of optical images which have been converted into corpuscular radiation (reproduction of television and cinema pictures) but also for the production of enlarged images adapted to facilitate the recognition of the structure of molecule groups or individual molecules.

While in the described embodiments the magnetic flux of the core is produced by a solenoid coil, it may according to a modification, alternatively be provided by permanent magnet means, for example by constructing all or part of the core structure as a permanent magnet.

I claim:

1. A system for producing focussed image radiation of electrically charged subatomic particles, comprising an envelope containing an image radiation emitting element and a target to which the radiation is to proceed, said target being spaced from the emitting element, means for producing an electric field accelerating the particles from said emitting element to the target, and magnet means including a tubular ferromagnetic core for producing a field having an axis passing approximately through said emitting element and said target, said magnet means being arranged in an axial direction outside the part of said axis confined between said emitting element and target.

2. A system for producing focussed electron radiation, comprising an envelope containing an electron image radiating element and a target to which the radiation is to proceed, said target being spaced from the image radiating element, means for producing an electric field accelerating the electrons from said image radiating element to the target, and magnet means including a tubular ferromagnetic core for producing a field having an axis passing approximately through said image radiating element and said target, said magnet means being arranged in an axial direction outside the part of said axis confined between said image radiating element and target.

3. A system as claimed in claim 2, wherein the electron image radiating element is a photo cathode, said magnet means being arranged on the side of said photo cathode remote from said target and having an axial passage permitting the access of light to the photo cathode.

4. A system as claimed in claim 1, wherein said magnet member includes a ferromagnetic core tapered to a small cross-section at one end and is arranged at the back of the target, said tapered end facing the back of the target.

5. A system as claimed in claim 1, wherein said magnet member includes a ferromagnetic core tapered to a small cross-section at one end and is arranged at the back of the radiation-emitting element, said tapered end facing the back of the radiation-emitting element.

6. The combination of an image converter tube comprising an evacuated envelope having two opposite end walls, a photo cathode and a fluorescent screen arranged in said envelope, respectively on opposite end walls thereof, with a magnet system including a tubular ferromagnetic core of a diameter less than half the mean diameter of said fluorescent screen, said core being magnetised in its longitudinal direction and producing a field having an axis passing approximately through said photo cathode and said fluorescent screen, said magnet system being arranged outside said envelope and in an axial direction outside the part of said axis confined between said photo cathode and said fluorescent screen.

7. The combination of an image converter tube comprising an evacuated envelope having two opposite end walls, a photo cathode and a fluorescent screen arranged in said envelope, respectively on opposite end walls thereof, with a magnet system including a tubular ferromagnetic core of a diameter less than half the mean diameter of said fluorescent screen, and means for magnetising said core in its longitudinal direction to produce a field having an axis passing approximately through said photo cathode and said fluorescent screen, said magnet system being arranged outside said envelope and in an axial direction outside the part of said axis confined between said photo cathode and said fluorescent screen.

8. An arrangement as claimed in claim 7, wherein the distance of the photo cathode from the fluorescent screen does not substantially exceed half the maximum diameter of the screen.

9. An arrangement as claimed in claim 1, which includes means for adjusting the shape of the magnetic field produced by the magnet means between the radiation emitting element and the target.

10. Apparatus as claimed in claim 1, wherein at least part of the magnet means is adjustably movable towards and away from the rear of one of the elements constituted by the radiation emitting element and the target.

11. Apparatus as claimed in claim 1, wherein at least a part of the magnet system is adjustably movable transversely to a line extending from the radiation-emitting element to the target member.

12. A system as claimed in claim 1, wherein the magnet system includes a ferromagnetic core member tapered towards one end to less than half its maximum diameter.

13. A system as claimed in claim 1, wherein the magnet system includes a ferromagnetic core structure composed of a plurality of parts at least one of said parts being adjustable relative to at least one other of said parts.

14. A system as claimed in claim 1, wherein the magnet system includes a ferromagnetic core structure and at least one permanently magnetised ferromagnetic member movable relative to said core structure.

15. A system as claimed in claim 1, wherein the magnet system includes a ferromagnetic core structure and a plurality of solenoid windings in flux-inducing relationship to said core structure.

16. A system as claimed in claim 15, wherein at least one of said windings is movable for adjustment relative to at least another one of said windings.

References Cited in the file of this patent
UNITED STATES PATENTS

| | | |
|---|---|---|
| 2,203,734 | Lubszynski | June 11, 1940 |
| 2,306,875 | Fremlin | Dec. 29, 1942 |
| 2,555,545 | Hunter et al. | June 5, 1951 |
| 2,567,674 | Linder | Sept. 11, 1951 |
| 2,572,644 | McGee | Oct. 23, 1951 |
| 2,622,225 | Linder | Dec. 16, 1952 |
| 2,727,182 | Francken | Dec. 13, 1955 |
| 2,803,770 | Harkensee | Aug. 20, 1957 |